US012242639B2

(12) United States Patent
Kurian et al.

(10) Patent No.: US 12,242,639 B2
(45) Date of Patent: Mar. 4, 2025

(54) TUNABLE AI SYSTEM AND MODELS ASSOCIATED THEREWITH BASED ON SECURITY CLEARANCE LEVEL

(71) Applicant: Bank of America Corporation, Charlotte, NC (US)

(72) Inventors: Manu Kurian, Dallas, TX (US); Ana Maxim, Arlington, VA (US); Vinesh Patel, London (GB); Michael Young, Davidson, NC (US)

(73) Assignee: Bank of America Corporation, Charlotte, NC (US)

( * ) Notice: Subject to any disclaimer, the term of this patent is extended or adjusted under 35 U.S.C. 154(b) by 126 days.

(21) Appl. No.: 18/222,527

(22) Filed: Jul. 17, 2023

(65) Prior Publication Data
US 2025/0028851 A1   Jan. 23, 2025

(51) Int. Cl.
*G06F 21/00* (2013.01)
*G06F 21/62* (2013.01)

(52) U.S. Cl.
CPC ........ *G06F 21/6227* (2013.01); *G06F 21/629* (2013.01)

(58) Field of Classification Search
None
See application file for complete search history.

(56) References Cited

U.S. PATENT DOCUMENTS

| | | | | |
|---|---|---|---|---|
| 8,583,574 | B2* | 11/2013 | Rodriguez | H04L 9/3226 706/15 |
| 9,032,531 | B1* | 5/2015 | Scorvo | G06F 21/6254 726/25 |
| 10,148,677 | B2* | 12/2018 | Muddu | H04L 63/20 |
| 11,146,472 | B1* | 10/2021 | Sinks | H04L 63/1425 |
| 11,403,559 | B2* | 8/2022 | Fridman | H04L 43/02 |
| 2022/0057519 | A1* | 2/2022 | Goldstein | G01S 17/88 |
| 2023/0169179 | A1* | 6/2023 | Govindasamy | G06F 9/54 726/25 |
| 2023/0171266 | A1* | 6/2023 | Brunner | H04L 41/16 726/23 |
| 2024/0311504 | A1* | 9/2024 | M | G06F 21/6218 |

* cited by examiner

Primary Examiner — Maung T Lwin
(74) Attorney, Agent, or Firm — Weiss & Arons LLP

(57) ABSTRACT

Methods and system are provided for tuning an artificial intelligence ("AI") system. The methods and system may include training the AI system to identify distinct users their distinct interactions. The training may include receiving datatsets related to a plurality of distinct users and their plurality of distinct interactions. The AI system may parse the datasets to arrive at a plurality of sets of distinct interactions performed by respective distinct users, each distinct interaction may be associated with a level of security clearance. The AI system may receive a request from a user to access information. The methods and system may include the AI system initiating a communication with the user. The communication may be compared with the each set of distinct interactions until a user and level of security can be identified. The AI system may prompt the user to access information on the level of security clearance identified.

20 Claims, 4 Drawing Sheets

TUNABLE AI SYSTEM AND MODELS ASSOCIATED THEREWITH BASED ON SECURITY CLEARANCE LEVEL

FIELD OF TECHNOLOGY

Aspects of the disclosure relate to technology for tuning artificial intelligence ("AI") systems.

BACKGROUND OF THE DISCLOSURE

Artificial intelligence ("AI") systems with natural language processing ("NLP") software in use today may be capable of replicating a human response. AI systems may be equipped with voice cloning software and/or deep fake software. AI systems may be able to replicate what a human sounds like, looks like and/or things the human may say. AI systems with these capabilities raise security concerns.

Humans may interact differently with others based on several factors. Factors may include the relationship between the human and others, the setting of the interaction and/or the subject of the interaction. Examples of interactions may include public interactions, private interactions and/or professional interactions.

AI systems may replicate only what they can learn from datasets. AI systems may be limited to publicly available data. AI systems may not be able to replicate the human during a private or professional interaction.

Therefore, it would be desirable to provide AI systems to recognize distinct human interactions. It would be further desirable to assign a security level clearance to each type of distinct human interaction. It would be further desirable to limit access based on the security clearance level assigned.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which.

DETAILED DESCRIPTION OF THE DISCLOSURE

Figure 1:
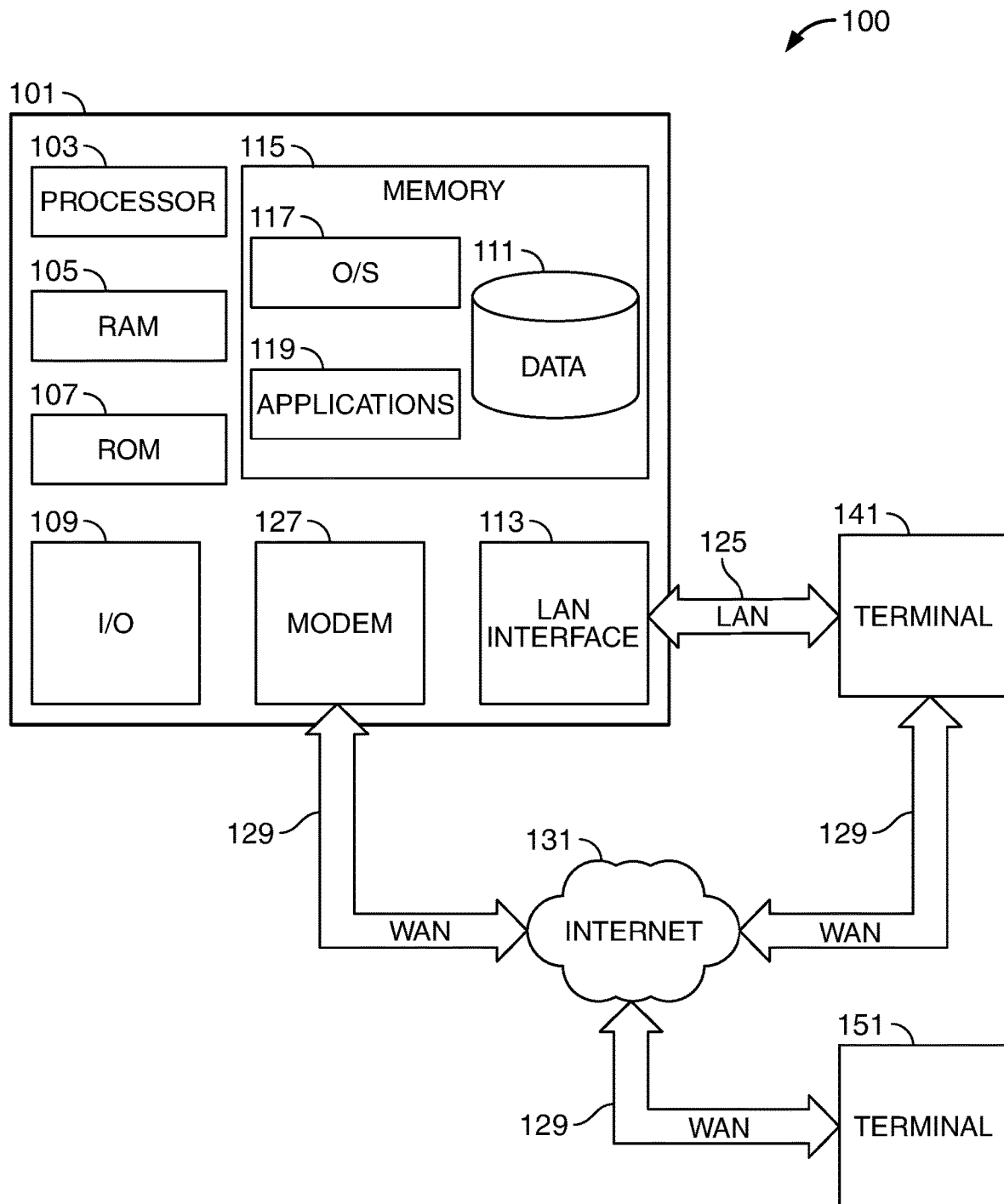
FIG. 1 shows an illustrative apparatus in accordance with principles of the disclosure.

Systems and methods are provided for tuning artificial intelligence ("AI") systems. The systems and methods may include training the AI system to identify distinct users. The systems and methods may include training the AI systems to identify distinct interactions of each distinct user.

The training may include receiving datasets related to a plurality of distinct users and a plurality of distinct interactions of each respective distinct user. The training may further include parsing the datasets to associate each respective distinct user with a set of distinct interactions performed by each respective distinct user. The training may further include associating low, medium and high levels of security clearance with respective distinct interactions in each respective set of distinct interactions. The training may further include storing the associations for each respective distinct user and each respective set of distinct interactions within a database. The systems and methods may include more than three levels of security clearance. The systems and methods may include any suitable number of levels of security clearance.

The AI system may identify the distinct user from the datasets. The AI system may identify the distinct user based on the user's voice pattern. The AI system may identify the distinct user based on where the dataset was created. The AI system may identify the distinct user based on an indication from the source of the dataset. The AI system may identify the distinct user based on an indication from the distinct user.

After the distinct user is identified, the AI system may create a set of distinct interactions performed by the user. The AI system may create the set of distinct interactions by parsing all the datasets to identify each interaction performed by the user. Once identified, the AI system may compile each interaction performed by the user into a set of distinct interactions. The distinct interactions may include jargon, point of interest words, inflections and/or speech patterns.

The systems and methods may include analyzing distinct interactions. The AI system may analyze the distinct interactions and assign each distinct interaction as one of a public, private and/or professional interaction. The AI system may assign the type of interaction based on a context of the distinct interaction, keywords used in the distinct interaction, an entity in which the respective distinct user is interacting with during the distinct interaction, a time when the distinct interaction took place, a length of the distinct interaction and/or a source that stored the dataset which included the distinct interaction.

The systems and methods may include more than three types of assigned interactions. The systems and methods may include varying levels of public, private and/or professional interactions. The public interactions may include 2, 3, 4 or any suitable number of levels of assigned interactions. The private interactions may include 2, 3, 4 or any suitable number of levels of assigned interactions. The professional interactions may include 2, 3, 4 or any suitable number of levels of assigned interactions.

The systems and methods may include associating low, medium and high levels of security clearance with respective distinct interactions in each respective set of distinct interactions. The AI system may associate the low level of security clearance with the public interactions. The AI system may associate the medium level of security clearance with the private interactions. The AI system may associate the high level of security clearance with the professional interactions. Distinct interactions may be categorized into multiple types of assigned interactions, these distinct interactions may be solely categorized as the type of assigned interaction with the higher level of security clearance.

The AI system may include three AI computer programs. A first AI computer program may be programmed to identify and assign public interactions. A second AI computer program may be programmed to identify and assign private interactions. A third AI computer program may be programmed to identify and assign professional interactions. The AI system may include any suitable number of computer programs. The AI system may include a separate computer program, programmed to identify distinct interactions at each level of each assigned interaction.

The systems and methods may include a trained AI system monitoring a communication by a user. The communication may be from a user external to an entity directed to the entity and/or from a user internal to an entity directed to a separate user internal to the entity. The communication may be over the phone, email, chat bot, text and/or any other suitable medium.

The systems and methods may include the trained AI system comparing a user's communication with a plurality of sets of distinct interactions. The trained AI system may identify the user as a distinct user based on the comparison. The comparison may include using natural language processing ("NLP") to determine a percentage match between the communication to each set of distinct interactions. The user may be identified as the distinct user associated with the set of distinct interactions with the highest matching percentage. The highest matching percentage may be required to be above a predetermined user matching threshold. The user matching threshold may be a matching percentage of 90% or higher.

The systems and methods may include when the highest matching percentage is not above the user matching threshold, the AI software continues to monitor the communication. The AI system may repeat the distinct user comparison at predetermined intervals. The predetermined intervals may be every 1 minute, 2 minutes, 5 minutes, 10 minutes or any other suitable time frame. The distinct user comparison may be repeated until the predetermined user matching threshold is met or exceeded.

Should the highest matching percentage remain below the user matching threshold after a predetermined time interval and/or a predetermined number of repeated comparisons, the user may not be given a level of security clearance. The predetermined time interval may be 30 minutes, 45 minutes, an hour or any other suitable time frame. The predetermined number of repeated comparisons may be 10, 15, 20 or any other suitable amount. The user may be flagged without a level of security clearance. The user may be determined to be a security risk without a level of security clearance.

The systems and methods may include the trained AI system comparing a user's communication with each respective distinct interaction within a set of distinct interactions associated with the user. The trained AI system may identify a level of security clearance based on the comparison. The comparison may include using natural language processing ("NLP") to determine a percentage match between the communication to each distinct interactions within the set of distinct interactions. The level of security clearance may be identified as the level of security clearance associated with the distinct interaction with the highest matching percentage. The highest matching percentage may be required to be above a predetermined distinct interaction matching threshold. The distinct interaction matching threshold may be a matching percentage of 90% or higher.

The systems and methods may include when the highest matching percentage is not above the distinct interaction matching threshold, the AI software continues to monitor the communication. The AI system may repeat the level of security clearance comparison at predetermined intervals. The predetermined intervals may be every 1 minute, 2 minutes, 5 minutes, 10 minutes or any other suitable time frame. The level of security clearance comparison may be repeated until the predetermined distinct interaction matching threshold is met or exceeded.

Should the highest matching percentage remain below the distinct interaction matching threshold after a predetermined time interval and/or a predetermined number of repeated comparisons, the user may not be given a level of security clearance. The predetermined time interval may be 30 minutes, 45 minutes, an hour or any other suitable time frame. The predetermined number of repeated comparisons may be 10, 15, 20 or any other suitable amount. The user may be flagged without a level of security clearance. The user may be determined to be a security risk without a level of security clearance.

The systems and methods may include prompting the user to access low, medium and/or high levels of information based on the respective level of security clearance identified in the level of security clearance comparison. The trained AI system may restrict the user from accessing information above the user's identified level of security clearance.

The systems and methods may include monitoring a communication continuously. The level of security clearance comparison may be repeated at predetermined intervals. The predetermined intervals may be every 1 minute, 2 minutes, 5 minutes, 10 minutes or any other suitable time frame. The repeated comparison may determine a new level of security clearance. The new level of security clearance may be a higher level of security clearance or a lower level of security clearance. The trained AI system may tune the level of security clearance to match the new level of security clearance.

The systems and methods may include retraining an AI system using an on-going communication that the AI system is monitoring. The retraining may be repeated at predetermined intervals. The predetermined intervals may be every 1 minute, 2 minutes, 5 minutes, 10 minutes or any other suitable time frame. The retraining may include the on-going communication and/or unparsed datasets received at the AI system.

The systems and methods may include the AI system sharing the stored associations with a third party. The AI system may include sharing the flagged users with the third party. The AI system may include sharing the reasons why the user was flagged with the third party. The AI system may include sharing the security risks with the third party. The AI system may include only sharing information with the third party upon verification that the third party has a high level of security clearance. The verification may be based on the credentials of the third party.

The systems and methods may include only sharing information regarding a single distinct user with the third party. The information regarding the single distinct user may only be shared with the third party upon verification that the third party is authorized to receive information regarding the distinct user. The verification may be based on the credentials of the third party. The information may be requested by the third party. The AI system may automatically share the information upon a user being flagged or otherwise identified as a security risk.

In some embodiments, the systems and methods may include a trained AI system receiving a request by a user to access information. The AI system may prompt the user to initiate a communication with the AI system. The AI system may identify the user from the communication. The AI system may identify a level of security clearance of the user from the communication. The AI system may prolong the communication for a predetermined interval of time before attempting to identify the user and/or the level of security clearance of the user. The predetermined interval of time may be 1 minute, 2 minutes, 5 minutes, 10 minutes or any other suitable time frame.

The systems and methods may include the trained AI system comparing the communication with a plurality of sets of distinct interactions. The trained AI system may identify the user as a distinct user based on the comparison.

The comparison may include using natural language processing ("NLP") to determine a percentage match between the communication to each set of distinct interactions. The user may be identified as the distinct user associated with the set of distinct interactions with the highest matching percentage. The highest matching percentage may be required to be above a predetermined user matching threshold. The user matching threshold may be a matching percentage of 90% or higher.

The systems and methods may include when the highest matching percentage is not above the user matching threshold, the AI software prolongs the communication. The AI system may repeat the distinct user comparison at predetermined intervals. The predetermined intervals may be every 1 minute, 2 minutes, 5 minutes, 10 minutes or any other suitable time frame. The distinct user comparison may be repeated until the predetermined user matching threshold is met or exceeded.

Should the highest matching percentage remain below the user matching threshold after a predetermined time interval and/or a predetermined number of repeated comparisons, the user may not be given a level of security clearance. The predetermined time interval may be 30 minutes, 45 minutes, an hour or any other suitable time frame. The predetermined number of repeated comparisons may be 10, 15, 20 or any other suitable amount. The user may be flagged without a level of security clearance. The user may be determined to be a security risk without a level of security clearance.

The systems and methods may include the trained AI system comparing a user's communication with each respective distinct interaction within a set of distinct interactions associated with the user. The trained AI system may identify a level of security clearance based on the comparison. The comparison may include using natural language processing ("NLP") to determine a percentage match between the communication to each distinct interactions within the set of distinct interactions. The level of security clearance may be identified as the level of security clearance associated with the distinct interaction with the highest matching percentage. The highest matching percentage may be required to be above a predetermined distinct interaction matching threshold. The distinct interaction matching threshold may be a matching percentage of 90% or higher.

The systems and methods may include when the highest matching percentage is not above the distinct interaction matching threshold, the AI software prolongs the communication. The AI system may repeat the level of security clearance comparison at predetermined intervals. The predetermined intervals may be every 1 minute, 2 minutes, 5 minutes, 10 minutes or any other suitable time frame. The level of security clearance comparison may be repeated until the predetermined distinct interaction matching threshold is met or exceeded.

Should the highest matching percentage remain below the distinct interaction matching threshold after a predetermined time interval and/or a predetermined number of repeated comparisons, the user may not be given a level of security clearance. The predetermined time interval may be 30 minutes, 45 minutes, an hour or any other suitable time frame. The predetermined number of repeated comparisons may be 10, 15, 20 or any other suitable amount. The user may be flagged without a level of security clearance. The user may be determined to be a security risk without a level of security clearance.

Once a user and security clearance level are identified the user may be prompted to access low, medium and/or high levels of information based on the respective level of security clearance identified in the level of security clearance comparison. The trained AI system may restrict the user from accessing information above the user's identified level of security clearance.

One of ordinary skill in the art will appreciate that the steps shown and described herein may be performed in other than the recited order and that one or more steps illustrated may be optional. Apparatus and methods may involve the use of any suitable combination of elements, components, method steps, computer-executable instructions, or computer-readable data structures disclosed herein.

As will be appreciated by one of skill in the art, the invention described herein may be embodied in whole or in part as a method, a data processing system, or a computer program product. Accordingly, the invention may take the form of an entirely hardware embodiment, an entirely software embodiment or an embodiment combining software, hardware and any other suitable approach or apparatus.

Illustrative embodiments of apparatus and methods in accordance with the principles of the invention will now be described with reference to the accompanying drawings, which form a part hereof. It is to be understood that other embodiments may be utilized, and that structural, functional, and procedural modifications may be made without departing from the scope and spirit of the present invention.

Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

In accordance with principles of the disclosure, FIG. 1 shows an illustrative block diagram of apparatus 100 that includes a computer 101. Computer 101 may alternatively be referred to herein as a "computer system" or "computing device." Elements of apparatus 100, including computer 101, may be used to implement various aspects of the systems and method disclosed herein. A "user" of apparatus 100 or computer 101 may include other computer systems or servers or computing devices, such as the program described herein.

Computer 101 may have one or more processors/microprocessors 103 for controlling the operation of the device and its associated components, and may include RAM 105, ROM 107, input/output module 109, and a memory 115. The microprocessors 103 may also execute all software running on the computer 101, e.g., the operating system 117 and applications 119 such as an automatic data layering program and security protocols. Other components commonly used for computers, such as EEPROM or Flash memory or any other suitable components, may also be part of the computer 101.

The memory 115 may be comprised of any suitable permanent storage technology—e.g., a hard drive or other non-transitory memory. The ROM 107 and RAM 105 may be included as all or part of memory 115. The memory 115 may store software including the operating system 117 and application(s) 119 (such as an automatic data layering program and security protocols) along with any other data 111 (e.g., historical data, configuration files) needed for the operation of the apparatus 100. Memory 115 may also store applications and data. Alternatively, some or all of computer executable instructions (alternatively referred to as "code") may be embodied in hardware or firmware (not shown). The microprocessor 103 may execute the instructions embodied by the software and code to perform various functions.

The network connections/communication link may include a local area network (LAN) and a wide area network (WAN or the Internet) and may also include other types of networks. When used in a WAN networking environment, the apparatus may include a modem or other means for establishing communications over the WAN or LAN. The modem and/or a LAN interface may connect to a network via an antenna. The antenna may be configured to operate over Bluetooth, wi-fi, cellular networks, or other suitable frequencies.

Any memory may be comprised of any suitable permanent storage technology—e.g., a hard drive or other non-transitory memory. The memory may store software including an operating system and any application(s) (such as an automatic data layering program and security protocols) along with any data needed for the operation of the apparatus and to allow bot monitoring and IoT device notification. The data may also be stored in cache memory, or any other suitable memory.

An input/output ("I/O") module 109 may include connectivity to a button and a display. The input/output module may also include one or more speakers for providing audio output and a video display device, such as an LED screen and/or touchscreen, for providing textual, audio, audiovisual, and/or graphical output.

In an embodiment of the computer 101, the microprocessor 103 may execute the instructions in all or some of the operating system 117, any applications 119 in the memory 115, any other code necessary to perform the functions in this disclosure, and any other code embodied in hardware or firmware (not shown).

In an embodiment, apparatus 100 may consist of multiple computers 101, along with other devices. A computer 101 may be a mobile computing device such as a smartphone or tablet.

Apparatus 100 may be connected to other systems, computers, servers, devices, and/or the Internet 131 via a local area network (LAN) interface 113.

Apparatus 100 may operate in a networked environment supporting connections to one or more remote computers and servers, such as terminals 141 and 151, including, in general, the Internet and "cloud". References to the "cloud" in this disclosure generally refer to the Internet, which is a world-wide network. "Cloud-based applications" generally refers to applications located on a server remote from a user, wherein some or all the application data, logic, and instructions are located on the internet and are not located on a user's local device. Cloud-based applications may be accessed via any type of internet connection (e.g., cellular or wi-fi).

Terminals 141 and 151 may be personal computers, smart mobile devices, smartphones, IoT devices, or servers that include many or all the elements described above relative to apparatus 100. The network connections depicted in FIG. 1 include a local area network (LAN) 125 and a wide area network (WAN) 129 but may also include other networks. Computer 101 may include a network interface controller (not shown), which may include a modem 127 and LAN interface or adapter 113, as well as other components and adapters (not shown). When used in a LAN networking environment, computer 101 is connected to LAN 125 through a LAN interface or adapter 113. When used in a WAN networking environment, computer 101 may include a modem 127 or other means for establishing communications over WAN 129, such as Internet 131. The modem 127 and/or LAN interface 113 may connect to a network via an antenna (not shown). The antenna may be configured to operate over Bluetooth, wi-fi, cellular networks, or other suitable frequencies.

It will be appreciated that the network connections shown are illustrative and other means of establishing a communications link between computers may be used. The existence of various well-known protocols such as TCP/IP, Ethernet, FTP, HTTP, and the like is presumed, and the system can be operated in a client-server configuration. The computer may transmit data to any other suitable computer system. The computer may also send computer-readable instructions, together with the data, to any suitable computer system. The computer-readable instructions may be to store the data in cache memory, the hard drive, secondary memory, or any other suitable memory.

Application program(s) 119 (which may be alternatively referred to herein as "plugins," "applications," or "apps") may include computer executable instructions for an automatic data layering program and security protocols, as well as other programs. In an embodiment, one or more programs, or aspects of a program, may use one or more AI/ML algorithm(s). The various tasks may be related to analyzing and categorizing various data to layer the data according to levels of access.

Computer 101 may also include various other components, such as a battery (not shown), speaker (not shown), a network interface controller (not shown), and/or antennas (not shown).

Terminal 151 and/or terminal 141 may be portable devices such as a laptop, cell phone, tablet, smartphone, server, or any other suitable device for receiving, storing, transmitting and/or displaying relevant information. Terminal 151 and/or terminal 141 may be other devices such as remote computers or servers. The terminals 151 and/or 141 may be computers where a user is interacting with an application.

Any information described above in connection with data 111, and any other suitable information, may be stored in memory 115. One or more of applications 119 may include one or more algorithms that may be used to implement features of the disclosure, and/or any other suitable tasks.

In various embodiments, the invention may be operational with numerous other general purpose or special purpose computing system environments or configurations. Examples of well-known computing systems, environments, and/or configurations that may be suitable for use with the invention in certain embodiments include, but are not limited to, personal computers, servers, hand-held or laptop devices, tablets, mobile phones, smart phones, other Computers, and/or other personal digital assistants ("PDAs"), multiprocessor systems, microprocessor-based systems, set top boxes, programmable consumer electronics, network PCs, minicomputers, mainframe computers, distributed computing environments that include any of the above systems or devices, IoT devices, and the like.

Aspects of the invention may be described in the general context of computer-executable instructions, such as program modules, being executed by a computer. Generally, program modules include routines, programs, objects, components, data structures, etc., that perform particular tasks or implement particular abstract data types. The invention may also be practiced in distributed computing environments where tasks are performed by remote processing devices that are linked through a communications network, e.g., cloud-based applications. In a distributed computing environment, program modules may be located in both local and remote computer storage media including memory storage devices.

Figure 2:
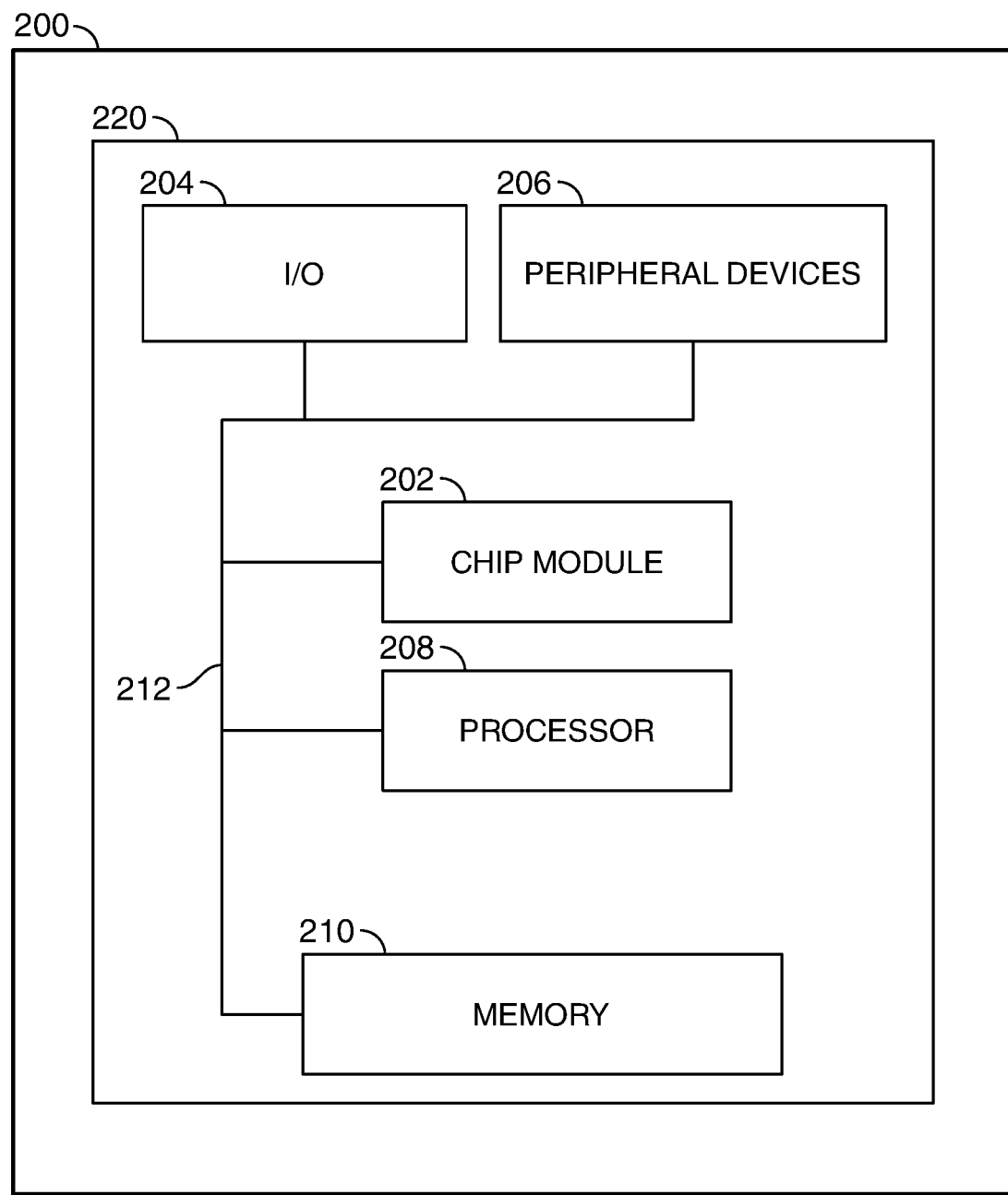
FIG. 2 shows another illustrative apparatus in accordance with principles of the disclosure.

FIG. 2 shows illustrative apparatus 200 that may be configured in accordance with the principles of the disclosure. Apparatus 200 may be a server or computer with various peripheral devices 206. Apparatus 200 may include one or more features of the apparatus shown in FIGS. 1-6. Apparatus 200 may include chip module 202, which may include one or more integrated circuits, and which may include logic configured to perform any other suitable logical operations.

Apparatus 200 may include one or more of the following components: I/O circuitry 204, which may include a transmitter device and a receiver device and may interface with fiber optic cable, coaxial cable, telephone lines, wireless devices, PHY layer hardware, a keypad/display control device, an display (LCD, LED, OLED, etc.), a touchscreen or any other suitable media or devices; peripheral devices 206, which may include other computers; logical processing device 208, which may compute data information and structural parameters of various applications; and machine-readable memory 210.

Machine-readable memory 210 may be configured to store in machine-readable data structures: machine executable instructions (which may be alternatively referred to herein as "computer instructions" or "computer code"), applications, signals, recorded data, and/or any other suitable information or data structures. The instructions and data may be encrypted.

Components 202, 204, 206, 208 and 210 may be coupled together by a system bus or other interconnections 212 and may be present on one or more circuit boards such as 220. In some embodiments, the components may be integrated into a single chip. The chip may be silicon-based.

Figure 3:
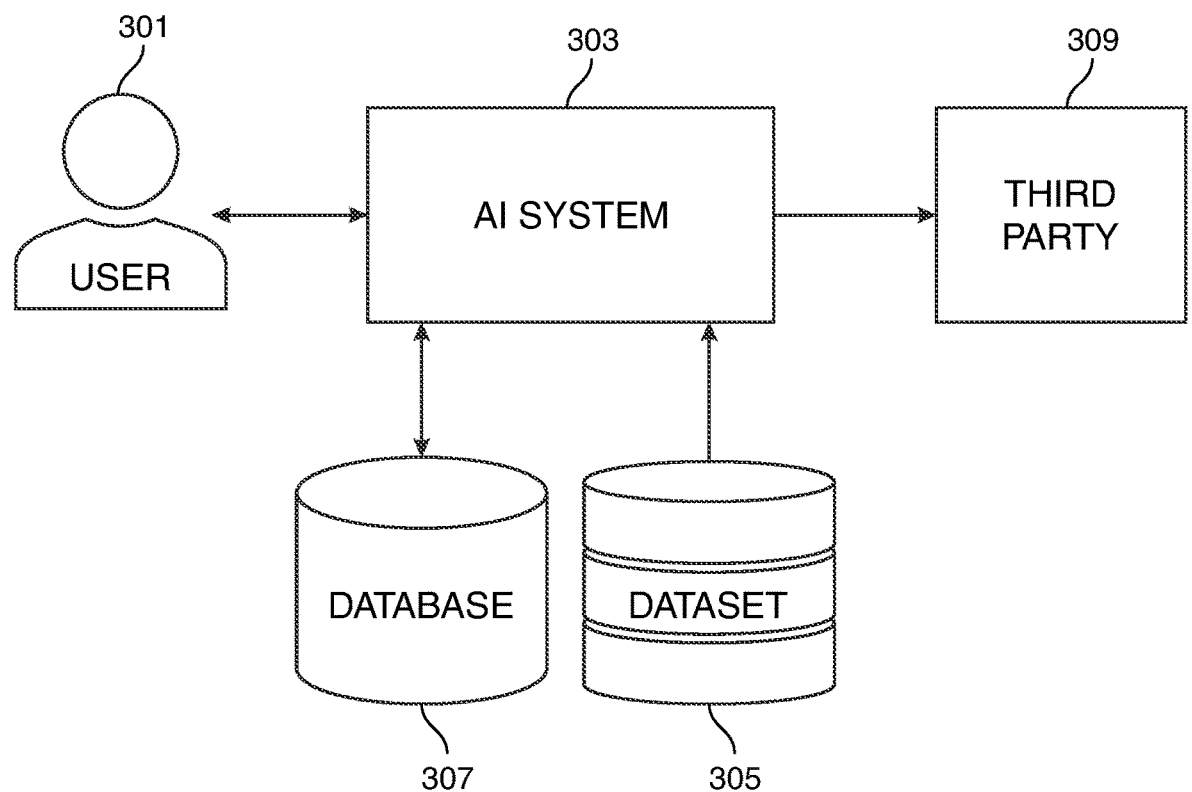
FIG. 3 shows yet another illustrative apparatus in accordance with principles of the disclosure.

FIG. 3 shows another illustrative apparatus in accordance with principles of the disclosure. User 301 may initiate a communication. AI system 303 may monitor the communication. AI system 303 may include computer 101. AI system 303 may include three computers 101. AI system 303 may receive datatsets 305. Datasets 305 may come from entities, users and/or the internet 131.

AI system 303 may parse datasets 305 to associate distinct users with a set of distinct interactions performed by each respective distinct user. AI system 303 may associate low, medium and high levels of security clearance with respective distinct interactions in each respective set of distinct interactions. AI system 303 may store all the associations in database 307. AI system 303 may share the stored associations with third party 309.

Figure 4:
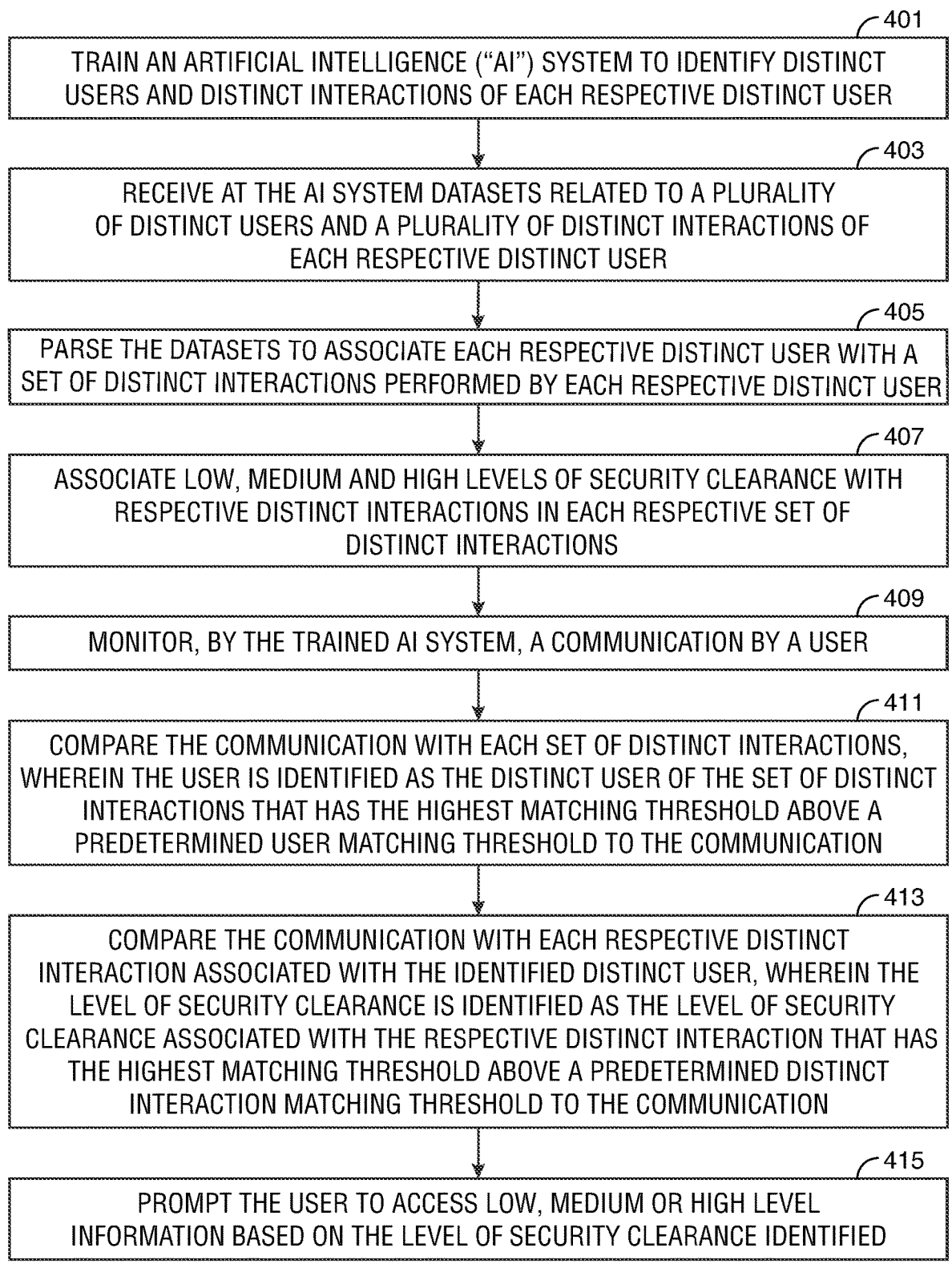
FIG. 4 shows an illustrative flowchart in accordance with principles of the disclosure.

FIG. 4 shows an illustrative flowchart in accordance with principles of the disclosure. At step 401, methods may include training an artificial intelligence ("AI") system to identify distinct users and distinct interactions of each respective distinct user. At step 403, methods may include receiving at the AI system datasets related to a plurality of distinct users and a plurality of distinct interactions of each respective distinct user.

At step 405, methods may include parsing the datasets to associate each respective distinct user with a set of distinct interactions performed by each respective distinct user. At step 407, methods may include associating low, medium and high levels of security clearance with respective distinct interactions in each respective set of distinct interactions. At step 409, methods may include monitoring, by the trained AI system, a communication by a user.

At step 411, methods may include comparing the communication with each set of distinct interactions, wherein the user is identified as the distinct user of the set of distinct interactions that has the highest matching threshold above a predetermined user matching threshold to the communication.

At step 413, methods may include comparing the communication with each respective distinct interaction associated with the identified distinct user, wherein the level of security clearance is identified as the level of security clearance associated with the respective distinct interaction that has the highest matching threshold above a predetermined distinct interaction matching threshold to the communication.

At step, 415, methods may include prompting the user to access low, medium or high level information based on the level of security clearance identified.

Thus, systems and methods for TUNABLE AI SYSTEM AND MODELS ASSOCIATED THEREWITH BASED ON SECURITY CLEARANCE LEVEL have been provided. Persons skilled in the art will appreciate that the present invention can be practiced by other than the described embodiments, which are presented for purposes of illustration rather than of limitation, and that the present invention is limited only by the claims that follow.

What is claimed is:

1. A method for tuning an artificial intelligence ("AI") system, the method comprising:
    training the AI system, in a first training step, to identify distinct users and distinct interactions of each respective distinct user, the first training step comprising:
        receiving, at the AI system, datasets related to a plurality of distinct users and a plurality of distinct interactions of each respective distinct user;
        parsing, in a first parsing step by the AI system, the datasets to associate each respective distinct user of the plurality of distinct users with a set of distinct interactions performed by each respective distinct user;
        associating, in a first associating step by the AI system, low, medium and high levels of security clearance with respective distinct interactions in each respective set of distinct interactions; and
        storing the associations for each respective distinct user and each respective set of distinct interactions within a database;
    monitoring, by the trained AI system, a communication by a user;
    comparing, in a first comparison step by the trained AI system, the communication with each set of distinct interactions, wherein the user is identified as the distinct user of the set of distinct interactions that has the highest matching threshold above a predetermined user matching threshold to the communication;
    comparing, in a second comparison step by the trained AI system, the communication with each respective distinct interaction within the set of distinct interactions associated with the identified distinct user in the first comparison step; wherein the level of security clearance is identified as the level of security clearance associated with the respective distinct interaction that has the highest matching threshold above a predetermined distinct interaction matching threshold to the communication; and prompting the user to access low, medium or high level information based on the respective level of security clearance identified in the second comparison step.

2. The method of claim 1, further comprising the steps of:
monitoring the communication continuously;
repeating the second comparison step at predetermined intervals;
tuning the level of security clearance to match the level of security clearance from the repeated second comparison step; and
prompting the user to access low, medium or high level information based on the tuned level of security clearance.

3. The method of claim 1, further comprising the step of:
repeating the first training step at predetermined intervals using the communication and unparsed datasets received at the AI system.

4. The method of claim 1, wherein:
each distinct interaction comprises jargon, point of interest words, inflections and speech patterns;
during the first parsing step, each of the plurality of distinct interaction are analyzed and assigned one of a public, private or professional interaction; and
the assigning of the public, private or professional interaction is based on a context of the distinct interaction, keywords used in the distinct interaction, an entity in which the respective distinct user is interacting with during the distinct interaction, a time when the distinct interaction took place, a length of the distinct interaction and a source that stored the dataset which included the distinct interaction.

5. The method of claim 4, wherein the first associating step comprises:
associating the low level of security clearance with the public interactions;
associating the medium level of security clearance with the private interactions; and
associating the high level of security clearance with the professional interactions.

6. The method of claim 5 wherein:
the AI system comprises three AI computer programs;
the first AI computer program is programmed to identify and assign the public interactions from the plurality of distinct interactions during the first parsing step;
the second AI computer program is programmed to identify and assign the private interactions from the plurality of distinct interactions during the first parsing step; and
the third AI computer program is programmed to identify and assign the professional interactions from the plurality of distinct interactions during the first parsing step.

7. The method of claim 1 further comprising the step of:
sharing the stored associations with a third party.

8. The method of claim 1 further comprising the step of:
sharing the stored associations for one respective distinct user of the plurality of distinct users with a third party, wherein the stored associations are shared with the third party upon verification that the third party has a high level of security clearance.

9. The method of claim 1, wherein:
when the predetermined user matching threshold is not reached the trained AI system continues to monitor the communication and repeats the first comparison step at predetermined intervals until the predetermined user matching threshold is met or exceeded; and
when the predetermined distinct interaction matching threshold is not reached the trained AI system continues to monitor the communication and repeats the second comparison step at predetermined intervals until the predetermined distinct interaction matching threshold is met or exceeded.

10. A method for tuning an artificial intelligence ("AI") system, the method comprising:
training the AI system, in a first training step, to identify distinct users and distinct interactions of each respective distinct user, the first training step comprising:
receiving, at the AI system, datasets related to a plurality of distinct users and a plurality of distinct interactions of each respective distinct user;
parsing, in a first parsing step by the AI system, the datasets to associate each respective distinct user of the plurality of distinct users with a set of distinct interactions performed by each respective distinct user;
associating, in a first associating step by the AI system, low, medium and high levels of security clearance with respective distinct interactions in each respective set of distinct interactions; and
storing the associations for each respective distinct user and each respective set of distinct interactions within a database;
receiving a request by a user to access information;
prompting the user to initiate a communication with the trained AI system;
comparing, in a first comparison step by the trained AI system, the communication with each set of distinct interactions, wherein the user is identified as the distinct user of the set of distinct interactions that has the highest matching threshold above a predetermined user matching threshold to the communication;
comparing, in a second comparison step by the trained AI system, the communication with each respective distinct interaction within the set of distinct interactions associated with the identified distinct user in the first comparison step; wherein the level of security clearance is identified as the level of security clearance associated with the respective distinct interaction that has the highest matching threshold above a predetermined distinct interaction matching threshold to the communication; and
prompting the user to access low, medium or high level information based on the respective level of security clearance identified in the second comparison step;
wherein:
when the predetermined user matching threshold is not reached the trained AI system prolongs the communication and repeats the first comparison step at predetermined intervals until the predetermined user matching threshold is met or exceeded; and
when the predetermined distinct interaction matching threshold is not reached the trained AI system prolongs the communication and repeats the second comparison step at predetermined intervals until the predetermined distinct interaction matching threshold is met or exceeded.

11. The method of claim 10, further comprising the step of:
repeating the first training step at predetermined intervals using the communication and unparsed datasets received at the AI system.

12. The method of claim 10, wherein:
each distinct interaction comprises jargon, point of interest words, inflections and speech patterns;
during the first parsing step, each of the plurality of distinct interactions are analyzed and assigned one of a public, private or professional interaction; and
the assigning of the public, private or professional interaction is based on a context of the distinct interaction, keywords used in the distinct interaction, an entity in which the respective distinct user is interacting with during the distinct interaction, a time when the distinct interaction took place and a source that stored the dataset which included the distinct interaction.

13. The method of claim 12, wherein the first associating step comprises:
associating the low level of security clearance with the public interactions;
associating the medium level of security clearance with the private interactions; and
associating the high level of security clearance with the professional interactions.

14. The method of claim 13 wherein:
the AI system comprises three AI computer programs;
the first AI computer program is programmed to identify and assign the public interactions from the plurality of distinct interactions during the first parsing step;
the second AI computer program is programmed to identify and assign the private interactions from the plurality of distinct interactions during the first parsing step; and
the third AI computer program is programmed to identify and assign the professional interactions from the plurality of distinct interactions during the first parsing step.

15. The method of claim 10 further comprising the step of:
sharing the stored associations for one respective distinct user of the plurality of distinct users with a third party, wherein the stored associations are shared with the third party upon verification that the third party has a high level of security clearance.

16. One or more non-transitory computer-readable media storing computer-executable instructions, which when executed by a processor on a computer system, perform a method for tuning an artificial intelligence ("AI") system, the method comprising:
training the AI system, in a first training step, to identify distinct users and distinct interactions of each respective distinct user, the first training step comprising:
receiving, at the AI system, datasets related to a plurality of distinct users and a plurality of distinct interactions of each respective distinct user;
parsing, in a first parsing step by the AI system, the datasets to associate each respective distinct user of the plurality of distinct users with a set of distinct interactions performed by each respective distinct user;
associating, in a first associating step by the AI system, low, medium and high levels of security clearance with respective distinct interactions in each respective set of distinct interactions; and
storing the associations for each respective distinct user and each respective set of distinct interactions within a database;
monitoring, by the trained AI system, a communication by a user;
comparing, in a first comparison step by the trained AI system, the communication with each set of distinct interactions, wherein the user is identified as the distinct user of the set of distinct interactions that has the highest matching threshold above a predetermined user matching threshold to the communication;
comparing, in a second comparison step by the trained AI system, the communication with each respective distinct interaction within the set of distinct interactions associated with the identified distinct user in the first comparison step; wherein the level of security clearance is identified as the level of security clearance associated with the respective distinct interaction that has the highest matching threshold above a predetermined distinct interaction matching threshold to the communication; and
prompting the user to access low, medium or high level information based on the respective level of security clearance identified in the second comparison step.

17. The media of claim 16, wherein the method further comprises the steps of:
monitoring the communication continuously;
repeating the second comparison step at predetermined intervals;
tuning the level of security clearance to match the level of security clearance from the repeated second comparison step; and
prompting the user to access low, medium or high level information based on the tuned level of security clearance.

18. The media of claim 16, wherein:
each distinct interaction comprises jargon, point of interest words, inflections and speech patterns;
during the first parsing step, each of the plurality of distinct interactions are analyzed and assigned one of a public, private or professional interaction; and
the assigning of the public, private or professional interaction is based on a context of the distinct interaction, keywords used in the distinct interaction, an entity in which the respective distinct user is interacting with during the distinct interaction, a time when the distinct interaction took place and a source that stored the dataset which included the distinct interaction.

19. The media of claim 18, wherein the first associating step comprises:
associating the low level of security clearance with the public interactions;
associating the medium level of security clearance with the private interactions; and
associating the high level of security clearance with the professional interactions.

20. The media of claim 19 wherein:
the AI system comprises three AI computer programs;
the first AI computer program is programmed to identify and assign the public interactions from the plurality of distinct interactions during the first parsing step;
the second AI computer program is programmed to identify and assign the private interactions from the plurality of distinct interactions during the first parsing step; and
the third AI computer program is programmed to identify and assign the professional interactions from the plurality of distinct interactions during the first parsing step.

* * * * *